(No Model.)
A. E. SPENCER.
CUSHION TIRE FOR VEHICLE WHEELS.
No. 569,523. Patented Oct. 13, 1896.
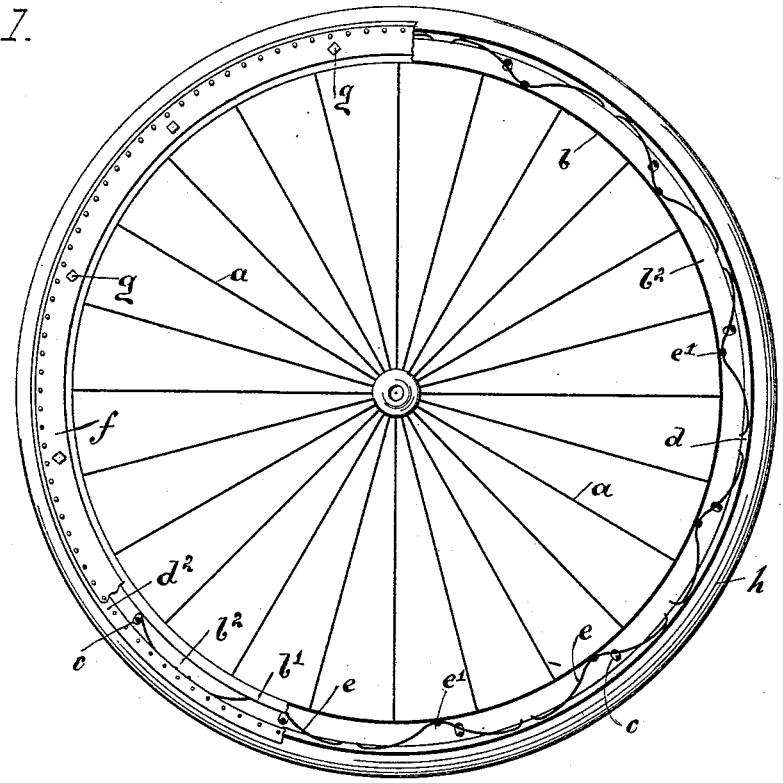
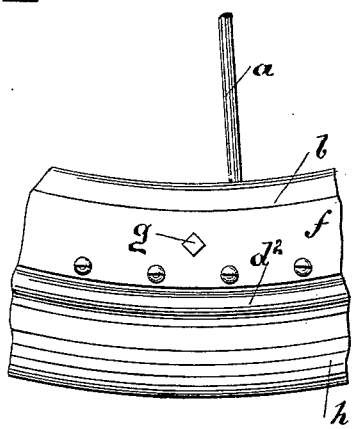
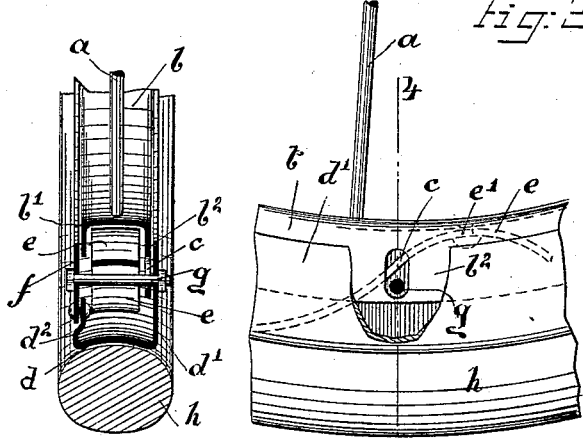

UNITED STATES PATENT OFFICE.

ALBERT E. SPENCER, OF BROOKLYN, NEW YORK.

CUSHION-TIRE FOR VEHICLE-WHEELS.

SPECIFICATION forming part of Letters Patent No. 569,523, dated October 13, 1896.

Application filed January 21, 1896. Serial No. 576,337. (No model.)

*To all whom it may concern:*

Be it known that I, ALBERT E. SPENCER, a citizen of the United States, residing at Brooklyn, in the county of Kings and State of New York, have invented a certain new and useful Improvement in Cushion-Tires for Vehicle-Wheels, of which the following is a specification, reference being had therein to the accompanying drawings.

My invention relates to improvements in cushion-tires for vehicle-wheels, but more particularly designed for use in bicycle-wheels.

The object of the invention is to provide a cushion-tire which will do away with the use of the ordinary so-called "pneumatic" tire and provide a tire that is durable, light in weight, and cheap to make, and one that cannot be punctured and rendered inoperative.

The invention consists of the novel features of construction hereinafter set forth and described, and more particularly pointed out in the claims hereto appended.

Referring to the drawings, Figure 1 is a front view partly broken away. Fig. 2 is part of a front view on an enlarged scale. Fig. 3 is part of a rear view. Fig. 4 is a sectional view taken on line 4 4 of Fig. 3.

Like letters refer to like parts throughout the several views.

$a\ a$ denote the spokes of ordinary construction, the outer ends of which are securely fastened to the inner rim $b$, which has two outwardly-projecting flanges $b'$ and $b^2$, the latter being provided with slots $c\ c$. This inner rim is made, preferably, of thin steel, light in weight, and integral with the flanges $b'$ and $b^2$.

$d$ denotes the outer rim, having two inwardly-projecting flanges $d'$ and $d^2$. This rim is also made, preferably, of thin steel, light in weight, and integral with the flanges $d'$ and $d^2$.

$e\ e$ denote flat elliptically-shaped springs, made, preferably, of thin steel and slightly upturned at their outer ends. These springs are securely bolted at their central points to the inner rim $b$ by bolts or rivets $e'$, and correspond in shape at those points to the shape of the outside of said inner rim. The outer ends of said springs rest upon the inner side of the outer rim $d$, and are so shaped as to exactly fit onto said rim and at the same time be free to expand in a longitudinal direction.

$f$ is a guard-plate securely bolted to the flange $d^2$. This guard, together with the inner and outer rims and their respective flanges, forms a "housing," so to speak, for the springs and prevents dirt and other foreign substances from entering and clogging the springs.

$g\ g$ are bolts which pass through the guard $f$, the slots $c\ c$, and the flange $d'$, and bind these parts securely together.

The flange $d'$ and the guard $f$ fit tightly over and around the flanges $b^2$ and $b'$, respectively, but at the same time not so tightly as to prevent the vertical telescopic movement of the outer rim together with its flanges and guard, as hereinafter described.

The outer rim $d$ is slightly concave in shape, so that the tread or tire $h$, of rubber or other suitable material, may be more easily held thereon.

When pressure is brought to bear upon the springs $e\ e$, these springs yield and permit the outer rim, together with its flanges and guard, to move inwardly or in a vertical direction over the flanges $b'$ and $b^2$ after the manner of a telescope, the bolts $g\ g$ moving in unison with said parts by reason of the slots $c\ c$ in the flange $b^2$, thus giving to the tire the quality of a cushion, such as is attained by the use of the ordinary pneumatic tire.

The slots $c\ c$ permit the outer rim to move in a vertical direction and thus prevent the outer rim from slipping around the springs, which it might otherwise have a tendency to do, for example, when climbing a hill. The bolts $g\ g$ are so arranged that each bolt tends to press against the outer side near the center of said springs and thus tend to prevent the "slipping," above referred to, when pressure is exerted on the springs.

What I claim as my invention, and desire to secure by Letters Patent, is—

1. In a vehicle-wheel, the combination of the inner rim $b$, having flanges $b'$ and $b^2$, the outer rim $d$, having flanges $d'$ and $d^2$, the guard $f$, with means as described for binding the parts together and preventing the outer rim from slipping around the inner rim, the springs $e$, inclosed within said parts, and the tread $h$, to form a cushion-tire, substantially as described.

2. In a vehicle-wheel, the combination of the inner rim $b$, having flanges $b'$ and $b^2$, the outer rim $d$ having flanges $d'$ and $d^2$, the guard $f$, with means as described for binding the parts together and preventing the outer rim from slipping around the inner rim, the springs $e$ inclosed within said parts, said outer rim and its adjacent parts arranged to move over the flanges of the inner rim after the manner of a telescope, and the tread $h$, to form a cushion-tire, substantially as described.

3. In a vehicle-wheel, the combination of the inner rim $b$, having flanges $b'$ and $b^2$, the outer rim $d$ having flanges $d'$ and $d^2$, the guard $f$, the bolts $g$ passing through the slots $c\ c$, and flange $d^2$ and adapted to move in a vertical direction and also slightly in a lateral direction, and the springs $e$, substantially as described and for the purposes specified.

4. In a vehicle-wheel, the combination of the inner rim $b$, having flanges $b'$ and $b^2$, the outer rim $d$ having flanges $d'$ and $d^2$, the guard $f$, the bolts $g$, and the springs $e$, the said bolts pressing against the outer side of said springs when pressure is exerted on the springs, substantially as described and for the purposes specified.

5. In a vehicle-wheel, the combination of the inner rim $b$, having flanges $b'$ and $b^2$, the outer rim $d$, having flanges $d'$ and $d^2$, the guard $f$, with means as described for binding the parts together and preventing the outer rim from slipping around the inner rim, and the springs $e$, inclosed within the said parts and having their free ends not abutting, and adapted to move in a longitudinal direction, substantially as described and for the purpose set forth.

In witness whereof I have hereto affixed my signature, this 18th day of January, 1896, in the presence of two witnesses.

ALBERT E. SPENCER.

Witnesses:
 N. L. FROTHINGHAM,
 F. T. WENTWORTH.